A. M. Rodgers.
Mosquito Net.

Nº 90,050. Patented May 11, 1869.

Witnesses,
Edwin Gates
Wm McNaughton

Inventor,
A. M. Rodgers

UNITED STATES PATENT OFFICE.

A. M. RODGERS, OF BROOKLYN, NEW YORK.

IMPROVED MOSQUITO AND FLY NET.

Specification forming part of Letters Patent No. 90,050, dated May 11, 1869.

*To all whom it may concern:*

Be it known that I, A. M. RODGERS, of the city of Brooklyn, in the county of Kings and State of New York, have invented a new and Improved Mosquito and Fly Net; and I do hereby declare that the following is a full, clear, and exact description of the same, reference being had to the accompanying drawings, which form part of this specification.

This invention consists in a novel construction of the frame of a mosquito and fly net, and novel arrangement of lifting-cords and their appurtenances for raising the net, whereby a neat and desirable apparatus is produced, susceptible of being secured to the ceiling over a bed or other desirable locality in the apartment, and of which the curtains or skirt of the net may be easily drawn up out of the way when not in immediate use, and also of which both the net and its frame may be readily and so entirely taken apart, when the season for its use is past, as to enable them to be packed in a trunk or other small receptacle, for convenience of storage or transportation, and afterward put together with equal facility when their service is again required.

Figure 1:
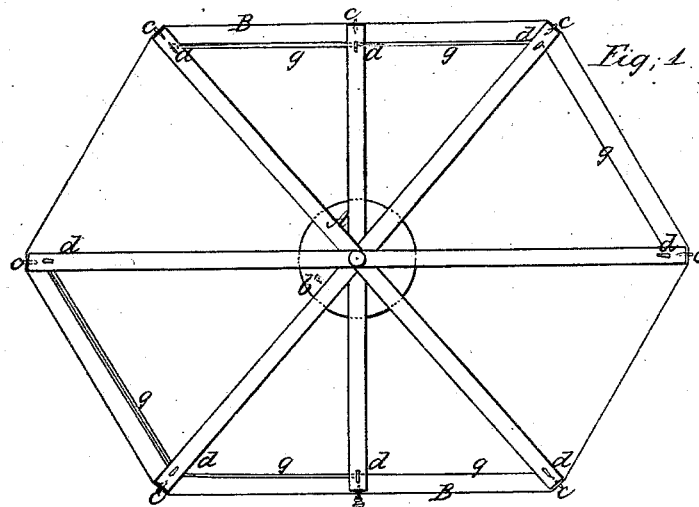
Figure 2:
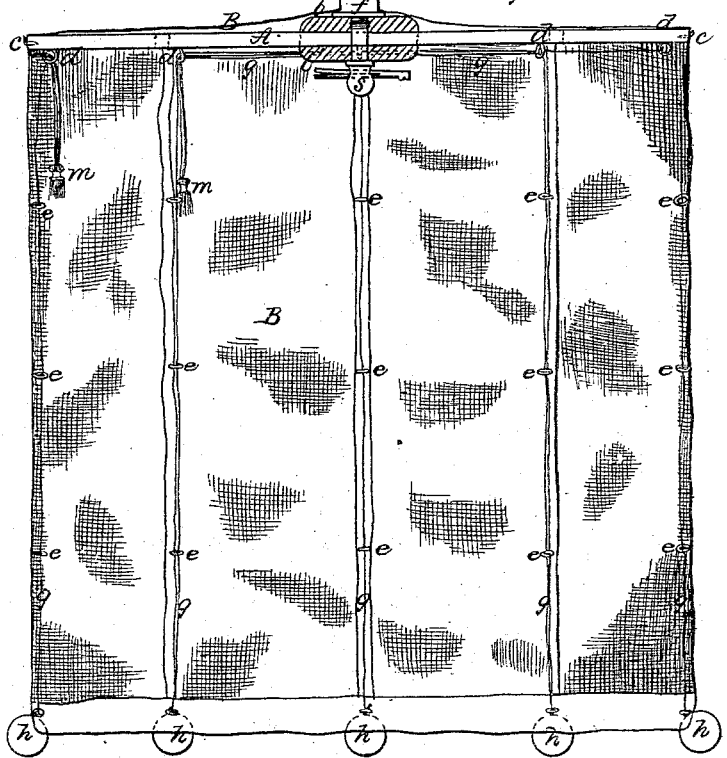

Referring to the accompanying drawings, Figure 1 represents a plan view of a net constructed according to this invention, a sufficient portion of the frame thereof being removed to illustrate the manner in which it is put together; and Fig. 2 represents a vertical section of the same.

Similar letters of reference indicate corresponding parts in both figures.

A is a frame, consisting of radial arms or spokes, uniting at a common center, and clamped thereat by upper and lower disks, $b$ $b'$, through which passes a screw, $s$. This screw $s$, having a head upon its lower end, and a nut, $f$, screwed upon its upper portion, for the purpose of clamping the disks $b$ $b'$ tightly to the arms, is made to project sufficiently above the said nut to screw into the ceiling, for the purpose, when desirable, of securing the apparatus thereto. Fixed to the ends of the said radial arms of the frame are hooks $c$, upon which are hung the sides or skirt of the net B. Attached to the inner side of said skirt is a series of guide rings or loops, $e$, arranged in perpendicular rows directly under the outer ends of the radial arms of the frame, which are also provided underneath with fixed guide-rings $d$.

Lifting-cords $g$ being attached to the bottom of the skirt, one directly under each row of guide-rings $e$, are passed through said rings, and also through fixed guide-rings $d$. Said cords $g$, after passing through the nearest fixed guide $d$, are conducted round the frame, through the other fixed guides, half in one direction and half in the other, so as to meet at a common point or points, and are finally passed downward far enough for easy manipulation. The extremities of said cords are or may be knotted or united in two parcels, and ornamented with tassels $m$ $m$, or other ornamental pendants, which, when the skirt is raised, are desired to be secured to some fixture suitably provided therefor, for the purpose of retaining it thus until it is again desired to be lowered. The said skirt is supplied with a number of weights, $h$, for facilitating the dropping of the same when the lifting-cords are released.

The top and sides of the net B are made separate, for the more convenient putting up and taking down of the apparatus, their line of connection being concealed by ornamental or appropriate trimming of any kind.

What I claim as my invention, and desire to have secured by Letters Patent, is—

1. The frame A, composed of detachable radial arms, the inner ends of which are formed to fit each other, and, so fitted, are secured around a common center by means of adjustable clamping-disks $b$ $b'$, carried upon a central screw, $s$, which also serves to secure the frame to the ceiling, substantially as herein described.

2. The arrangement of the lifting-cords $g$ and their guide-rings in connection with the weighted skirt of a mosquito or fly net, in combination with the above-claimed devices, substantially as and for the purpose herein set forth.

A. M. RODGERS.

Witnesses:
EDWIN GATES,
WM. McNAUGHTON.